Nov. 17, 1964    H. T. ADKINS    3,157,793
TURBO-ALTERNATOR GENERATOR
Filed July 31, 1961    2 Sheets-Sheet 1
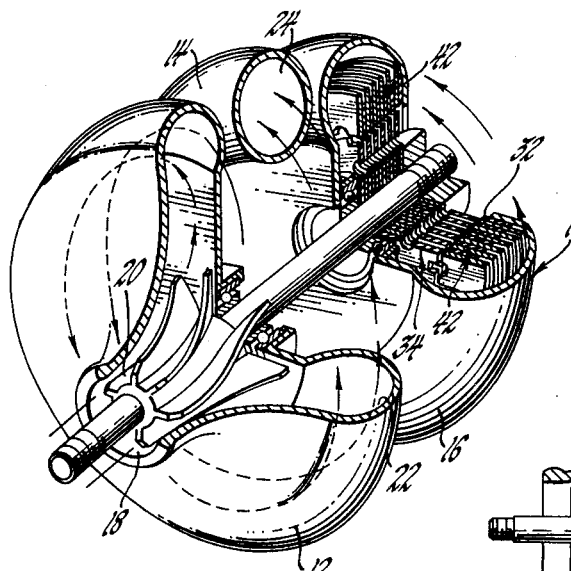
Fig.1
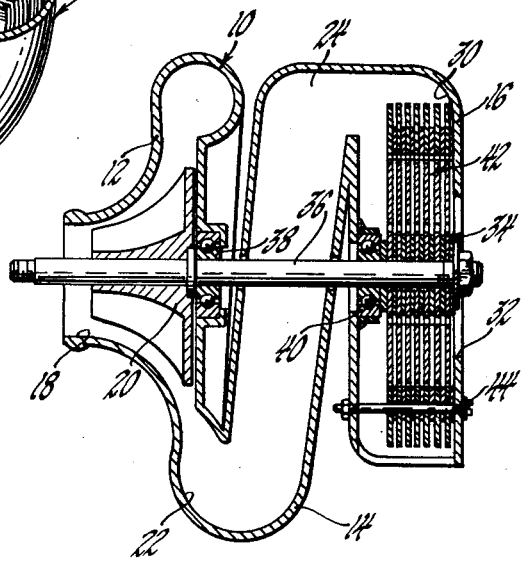
Fig.2
Fig.3
INVENTOR.
Harold T. Adkins
BY
Winnie and Barnard
ATTORNEYS Nov. 17, 1964  H. T. ADKINS  3,157,793
TURBO-ALTERNATOR GENERATOR
Filed July 31, 1961  2 Sheets-Sheet 2

INVENTOR.
Harold T. Adkins
BY
Winnie and Barnard
ATTORNEYS

3,157,793
TURBO-ALTERNATOR GENERATOR
Harold T. Adkins, St. Clair Shores, Mich., assignor to Curtiss-Wright Corporation, Utica, Mich., a corporation of Delaware
Filed July 31, 1961, Ser. No. 128,091
2 Claims. (Cl. 290—52)

This invention relates to alternator-generator devices in general and more particularly to a turbo-alternator construction having the turbine and alternator assemblies in combination.

Heretofore, turbines have been used as simply another drive power source for operating electrical power generators. The turbine has been entirely separate from the generator and has been operative of the generator through a separate drive shaft connection.

It is an object of this invention to provide a turbine and alternator in combination for greater simplicity of construction, achieving a more compact assembly, and attainment of a more efficient operative structure.

More specifically, it is an object of this invention to teach the combination of an inductor type generator and a Tesla type turbine.

My copending application S.N. 41,412 titled "High Speed Generator" discloses an alternator-generator having the stator and rotor members constructed of laminated magnetic discs which are conductive of magnetic flux. The alternator-generator disclosed by such application is of the inductor type whereby all field and power windings are provided on the stator and no windings are required to be disposed on the rotor. It is proposed to make use of this construction in having the laminated magnetic discs which form the rotor separated in parallel spaced relation in the manner of the rotor of the Telsa type turbine. The fluid flow between the plain surfaced and parallel spaced rotor discs induces rotation of the rotor as the fluid circulates in an inward spiral and transfers its velocity to the discs by surface friction.

In addition to the advantage of size, weight, and cost saving due to the multiple function of parts, other advantages include the minimization of normal bearing and seal problems, the elimination of vibration and fatigue normal in vane turbo-generator designs using partial or segmental entry, the transfer of any generator heat loss into heating the turbine working gas and incidental cooling due to large fluid or gas flow and the attainment of an extremely compact alternator set.

In the arrangement proposed, by extracting power electro-magnetically from the periphery of the turbine a large output shaft is not necessary and the area for exhaust near the center may be increased. Further, since no torque is transmitted by a spoke arrangement at the center of the turbine disc stresses are reduced and there is more exhaust area. The stiffening effect at low speeds due to the radial forces on the disc also allows thin, closely spaced discs to be used and increases the turbine efficiency.

These and other advantages will be more fully appreciated upon a reading of the following specification in regard to a preferred embodiment and with reference to the accompanying drawings wherein:

FIGURE 1 is a cut-away perspective view of a gas turbine generator set consisting of a single outlet centrifugal compressor, combustor and Tesla turbine-alternator combination structure.

FIGURE 2 is a cross sectional view of the turbine-alternator shown by FIGURE 1.

FIGURE 3 is an enlarged cross sectional side plan view through a turbine-alternator unit per se.

Figure 4:
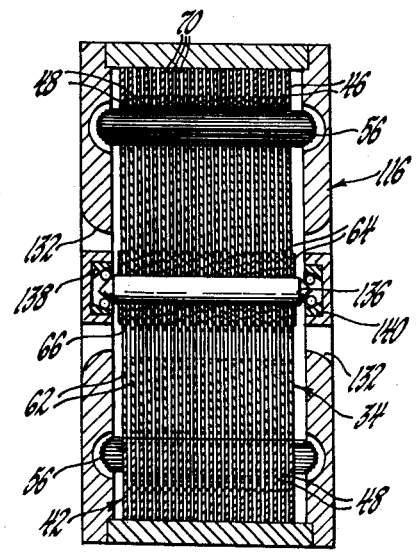
FIGURE 4 is a cross sectional view of the turbo-alternator section shown by FIGURE 3 as seen in the plane of line 4—4 thereon.

Referring to FIGURES 1 and 2:

The turbo-alternator 10 is shown to include a compressor housing 12, a combustor housing 14 and turbo-alternator housing 16 which are interconnected for fluid flow passage therebetween. The compressor housing 12 is formed to include a central inlet 18 and has a centrifugal compressor member 20 rotatably supported therein. Upon rotation of the compressor rotor 20 air is inducted through the inlet 18 and passed by the compressor blades to the toroidal outlet passage 22 communicating with the combustor housing 14.

The combustor housing 14 is shown as simply providing a toroidal passage 24 between the compressor housing 12 and the turbo-alternator housing 16. However, it will be appreciated that a combustible mixture is introduced or formed within the combustor housing and is ignited by means not shown.

The exhaust gases from the combustor housing 14 are received peripherally within the turbo-alternator housing 16. The housing 16 has a peripheral inlet 30 and a central outlet opening 32. A rotor member 34 is provided within the housing and is supported on a shaft 36 which is rotatably supported within bearings 38 and 40 provided in the side walls of the compressor and turbo-alternator housings 12 and 16 respectively. The rotor 34 is of the Tesla type which will subsequently be described.

The turbo-alternator 100 shown by FIGURES 3 and 4 is basically similar to that of FIGURES 1 and 2 except for the different housing structure 116. A tangential inlet passage 130 introduces the rotor driving fluid into the housing and it is exhausted through centrally disposed outlet passages 132 provided on both sides thereof. The rotor shaft 136 is journalled in bearings 138 and 140 within the housing side walls.

Since the stator assembly 42 and combination turbine and alternator rotor assembly 34 is essentially the same in both of the turbo-alternators 10 and 100 the same reference numerals have been used to identify common parts and subcombinations in the subsequent description.

A stator assembly 42 is provided circumferentially about the turbine rotor 34. The stator 42 is made up of a plurality of permeable discs 46 which are conductive of magnetic flux and are oriented in parallel spaced relation by nozzle discs 48 disposed therebetween.

Figure 7:
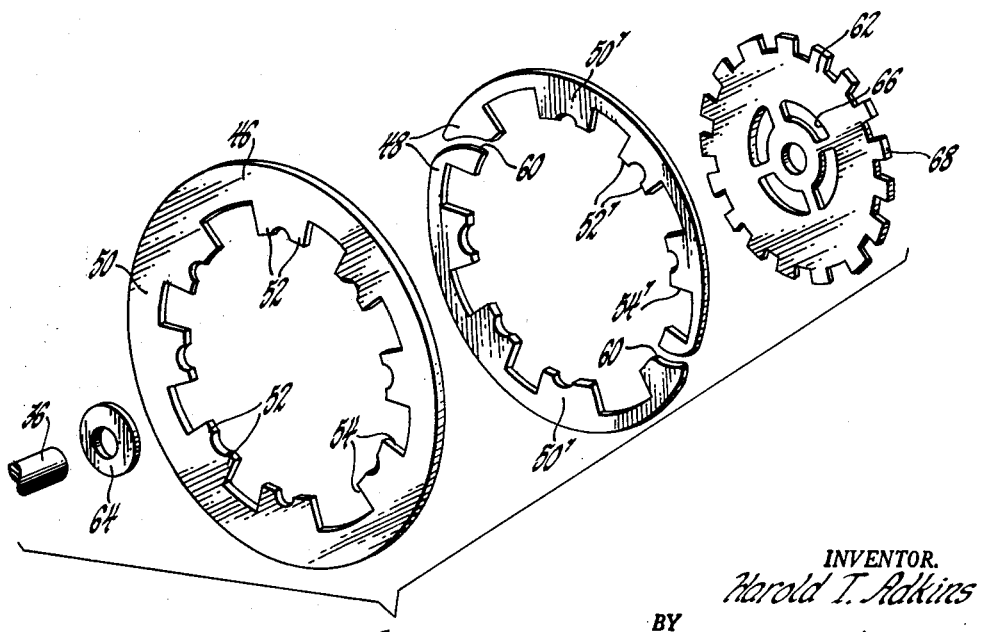
FIGURE 7 shows the alternator, stator and rotor disc construction in an exploded view.

The general configuration and orientation of the stator and nozzle discs, 46 and 48, are best shown by reference to FIGURES 3 and 7. The stator discs 46 are annular and are formed to include pole pieces 50 about their inner periphery. The pole pieces 50 are equally spaced and are each formed to include a pair of pole faces 52. The pole pieces 50 are separated by winding slots 54. Within the winding slots 54 are alternately disposed field windings 56 and power windings 58.

The nozzle discs 48 between the stator discs 46, are complementary of the stator discs 46 and inclusive of pole pieces 50', pole faces 52' and winding slots 54'. As will be appreciated the pole pieces, faces and winding slots of the stator and nozzle discs are axially aligned in the assembled construction. The nozzle discs 48 may be held in place by the field and power windings 56 and 58 which are disposed within the winding slots 54 and 54' of the respective members. However, as will be appreciated, other tie bolt means 44, such as shown in FIGURE 2, may be used.

Inlet nozzles 60 are provided within the nozzle discs 48 through one or more of the pole pieces 50'. The inlet nozzles 60 enable the turbine gases from the combustor housing 14 to pass through the stator assembly 42 and into engagement with the turbine rotor 34.

The turbine rotor 34 is of the Tesla type, as previously mentioned. The rotor includes a plurality of plane surfaced discs 62 which are mounted on the rotor shaft and are retained in such parallel relation by spacers 64. The rotor disc 62 receives turbine gases therebetween and the gases flow in a natural spiral inwardly while the adhesive and viscous action thereof impart energy movement to the rotor. As the velocity of the turbine gases drops, the fluid has less centrifugal force and is pushed radially inward. The discs are provided with fluid flow outlet openings 66 centrally thereof.

The rotor discs 62 are further formed to include magnetic poles 68 equally spaced about the outer periphery thereof. These rotor poles 68 are formed and spaced to alternately complement the stator pole faces 52 of the stator discs, as shown by FIGURE 3. Accordingly, the rotor 34 serves both as the rotor for the turbine and the alternator and makes use of the stator assembly 42 within the turbine casing in its latter capacity.

It will be noted that the stator discs 48 through which the inlet nozzles 60 are provided are smaller in width than the full annular stator discs 46. This provides flow passages 70 for turbine gases to a secondary entry nozzle on the other side of the first one.

The number of inlet flow nozzles, spacing of the rotor and stator discs, size of the inlet and outlet openings etc. may be adapted to fit different operating conditions in accord with well known principles of Tesla turbine construction.

The field and power windings 56 and 58 are preferably skein-loop windings which pass in opposite direction through alternate of the winding slots 54 and 54' within the stator discs. As will be appreciated, the connecting loops of the field and power windings may be provided on opposite sides of the stator assembly to avoid crossing.

The arrangement of field and power windings within the stator assembly 42 is best appreciated by showing the power windings 58 as toroidal windings. Accordingly, such an arrangement is used in FIGURES 5 and 6. Regardless of whether the power windings are loop skein or toroidal windings the alternate flux paths will be the same.

Figure 5:
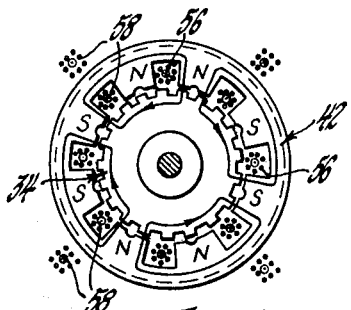
FIGURE 5 is a diagrammatic plan view of an alternator showing the flux path for one rotational position of the rotor member.

Referring to FIGURE 5, with the rotor 34 in the position and its poles 68 aligned with the pole faces 52 of alternate of the pole pieces 50 of the stator, the flux path is as shown by the closed loop arrowed lines. It will be appreciated that such a flux path induces a current flow in the different legs of the power windings 58, which are within alternate of the winding slots 54, which is additive.

Figure 6:
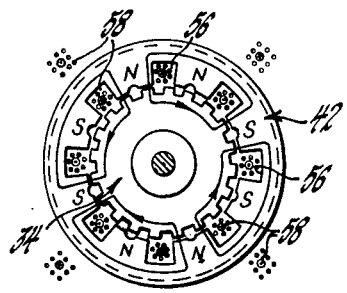
FIGURE 6 is a plan view of an alternator, similar to FIGURE 5, showing the flux path with the alternator in an advanced pole position.

Referring now to FIGURE 6, with the rotor 34 advanced one pole distance the rotor poles 68 come into alignment with the pole faces 52 of the alternate pole pieces 50 of the stator; that is, those with which the rotor pole faces were not previously aligned. The different alignment of the stator and rotor poles causes a change in the flux path as shown by the closed loop arrowed lines in FIGURE 6. As will be appreciated, this causes a reverse flow in the current direction. As a consequence a high frequency alternating current is produced in the power windings 58 by the high speed rotation of the rotor 34 within the stator assembly 42.

Further reference should be had to my copending application S.N. 41,412 titled "High Speed Generator" for a more detailed description and understanding of the alternator-generator per se.

It will be appreciated that the magnetic laminated discs which conduct the flux to and from various stator points also serve as the drive turbine discs of a partial or segmental entry turbine operating by surface friction. In addition to the advantage of size, weight and cost due to the multiple functioning of parts, the normal bearing and field problems are minimized. Further, the problem of vibration and fatigue normal in vaned turbo-generator designs using partial or segmental entry is eliminated. Although the iron and windings of the proposed generator must operate at turbine fluid or gas temperature, high temperature iron and insulation are available and preclude any serious disadvantage in this regard.

There are numerous advantages in extracting the power electro-magnetically from the periphery of the turbine arrangement proposed. A large output shaft is unnecessary and accordingly the area for exhaust is greater at the center of the rotor and on both sides thereof. Since no torque must be transmitted by the spokes in the center of the turbine disc stress factors are reduced and further exhaust area is available. The radial, magnetic and centrifugal forces on the discs provide a stiffening effect which allows thin, closely-spaced discs to be used.

The rotor and turbine members are inexpensive since they may be stamped from flat rolled sheets in a manner similar to electrical rotor laminations.

Although a preferred embodiment of this invention has been shown and described, it will be appreciated that certain modifications and improvements are within the scope of this disclosure. Such of these modifications and improvements as are not specifically excluded by the language of the hereinafter claims are to be considered as inclusive thereunder.

I claim:

1. The combination of a fluid driven turbine and an electrical power generator, comprising: a turbine housing having a generator stator provided therein, a turbine rotor mounted concentrically within said stator, said turbine rotor including a plurality of axially spaced parallel discs receptive of rotor driving fluid flow therebetween, means provided through said stator and axially through said rotor discs near the center thereof for rotor driving fluid flow through said housing, said stator and rotor being of magnetic laminar construction and having peripherally adjacent edges thereof formed to include alternately aligned and misaligned pole faces conductive of magnetic flux therebetween, said stator being provided by a plurality of parallel and axially aligned annular discs, and alternate of the latter discs being formed to provide nozzle means for the passage of rotor driving fluid flow therethrough.

2. The turbine and generator combination of claim 1 wherein said alternate stator discs are of a lesser outer diameter than the others thereof and provide a fluid flow passage with said turbine housing conductive of rotor driving fluid flow to different nozzle means.

References Cited in the file of this patent

UNITED STATES PATENTS

| | | |
|---|---|---|
| 748,215 | Porter et al. | Dec. 29, 1903 |
| 2,566,618 | Lindsey | Sept. 4, 1951 |